US012562416B2

(12) United States Patent
Baek et al.

(10) Patent No.: US 12,562,416 B2
(45) Date of Patent: Feb. 24, 2026

(54) POUCH-SHAPED SECONDARY BATTERY SEALING APPARATUS AND POUCH-SHAPED SECONDARY BATTERY MANUFACTURING METHOD

(71) Applicant: LG Energy Solution, Ltd., Seoul (KR)

(72) Inventors: Ju Hwan Baek, Daejeon (KR); Seung Bae Lee, Daejeon (KR); Jung Su Oh, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 681 days.

(21) Appl. No.: 17/913,594

(22) PCT Filed: Feb. 16, 2021

(86) PCT No.: PCT/KR2021/001969
§ 371 (c)(1),
(2) Date: Sep. 22, 2022

(87) PCT Pub. No.: WO2021/256658
PCT Pub. Date: Dec. 23, 2021

(65) Prior Publication Data
US 2023/0155215 A1 May 18, 2023

(30) Foreign Application Priority Data
Jun. 18, 2020 (KR) ........................ 10-2020-0074202

(51) Int. Cl.
H01M 50/105 (2021.01)
H01M 50/126 (2021.01)
(Continued)

(52) U.S. Cl.
CPC ....... H01M 50/105 (2021.01); H01M 50/126 (2021.01); H01M 50/178 (2021.01); H01M 50/186 (2021.01)

(58) Field of Classification Search
CPC . H01M 50/105; H01M 50/126; H01M 50/186
See application file for complete search history.

(56) References Cited

U.S. PATENT DOCUMENTS

2004/0253838 A1 12/2004 Yamazaki et al.
2008/0132041 A1* 6/2008 Yamazaki .......... B23K 26/0604
257/E21.328
(Continued)

FOREIGN PATENT DOCUMENTS

CN 1531023 A 9/2004
CN 207571367 U 7/2018
(Continued)

OTHER PUBLICATIONS

International Search Report for Application No. PCT/KR2021/001969 mailed Jun. 3, 2021, pp. 1-3.
(Continued)

*Primary Examiner* — Brittany L Raymond
(74) *Attorney, Agent, or Firm* — Lerner David LLP

(57) ABSTRACT

The present invention relates to a pouch-shaped secondary battery sealing apparatus and a pouch-shaped secondary battery manufacturing method capable of radiating an infrared laser to a sealed portion in an overlapping state, whereby it is possible to increase sealing force, to prevent occurrence of wrinkles, and to reduce sealing time when forming a sealed portion of a pouch-shaped secondary battery case.

12 Claims, 8 Drawing Sheets

(51) Int. Cl.
    *H01M 50/178*     (2021.01)
    *H01M 50/186*     (2021.01)

(56)            References Cited

U.S. PATENT DOCUMENTS

| | | | |
|---|---|---|---|
| 2012/0183748 A1* | 7/2012 | Schindler | B29C 65/18 |
| | | | 428/411.1 |
| 2014/0234732 A1 | 8/2014 | Park et al. | |
| 2015/0056744 A1 | 2/2015 | Song et al. | |
| 2015/0364629 A1 | 12/2015 | Song et al. | |
| 2015/0364630 A1 | 12/2015 | Song et al. | |
| 2015/0364638 A1 | 12/2015 | Song et al. | |
| 2016/0380320 A1 | 12/2016 | Park et al. | |
| 2020/0020907 A1 | 1/2020 | Wang et al. | |

FOREIGN PATENT DOCUMENTS

| | | | |
|---|---|---|---|
| JP | 2002336983 A | | 11/2002 |
| JP | 2006004687 A | | 1/2006 |
| JP | 2014-147954 A | | 8/2014 |
| KR | 2012-0056316 | * | 6/2012 |
| KR | 20120056316 A | | 6/2012 |
| KR | 101208217 B1 | | 12/2012 |
| KR | 101216423 B1 | | 12/2012 |
| KR | 20130130935 A | | 12/2013 |
| KR | 20140055427 A | | 5/2014 |
| KR | 20140104152 A | | 8/2014 |
| KR | 20160141864 A | | 12/2016 |
| KR | 101724141 B1 | | 4/2017 |
| KR | 20170045475 A | | 4/2017 |
| WO | 2022-108194 A1 | | 5/2022 |

OTHER PUBLICATIONS

Extended European Search Report for Application No. 1824962.1 dated Jun. 15, 2023. 7 pgs.

* cited by examiner

【FIG. 1】
-- Prior Art --
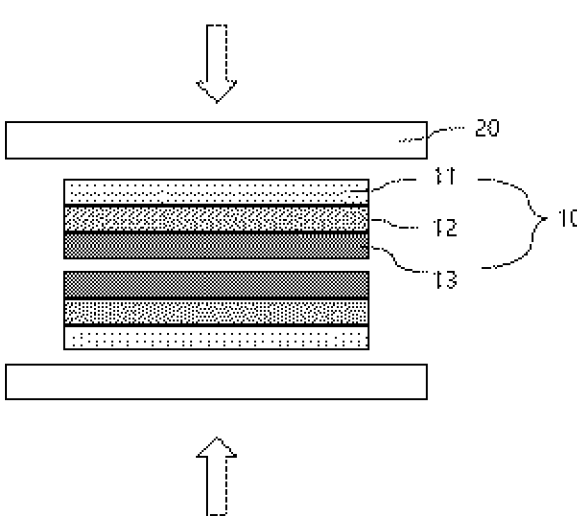

【FIG. 2】
-- Prior Art --
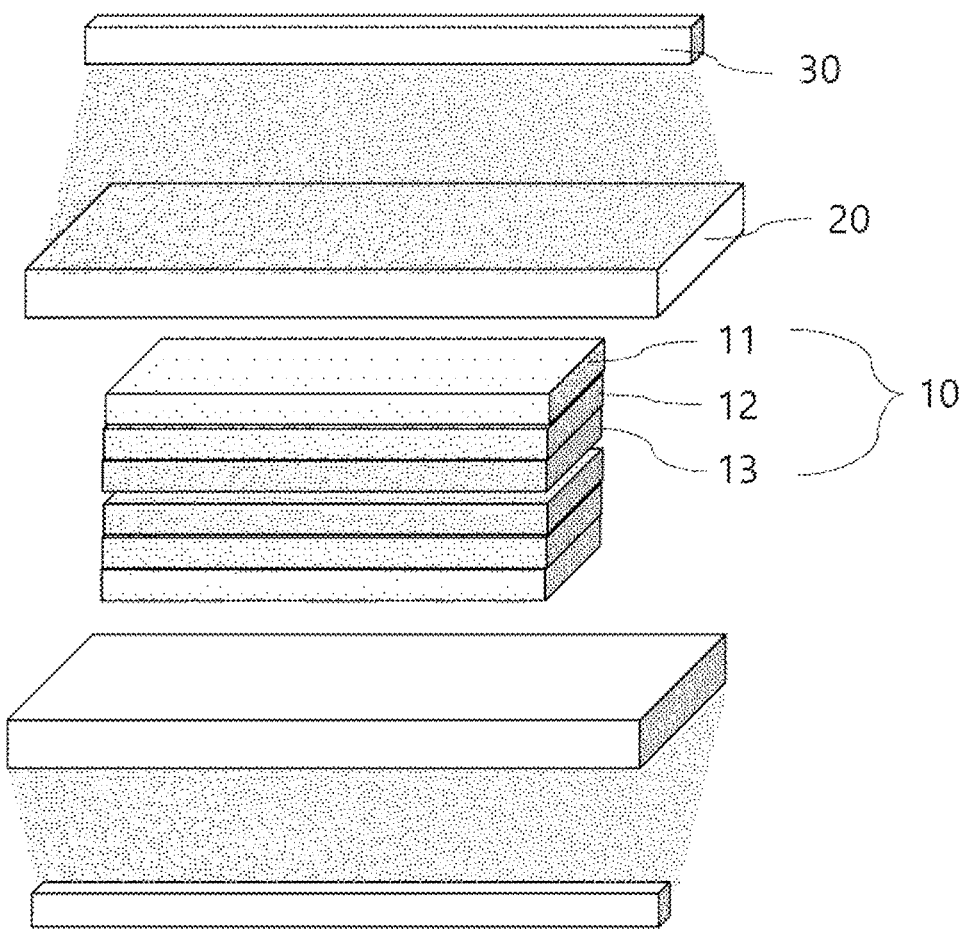

【FIG. 3】
-- Prior Art --
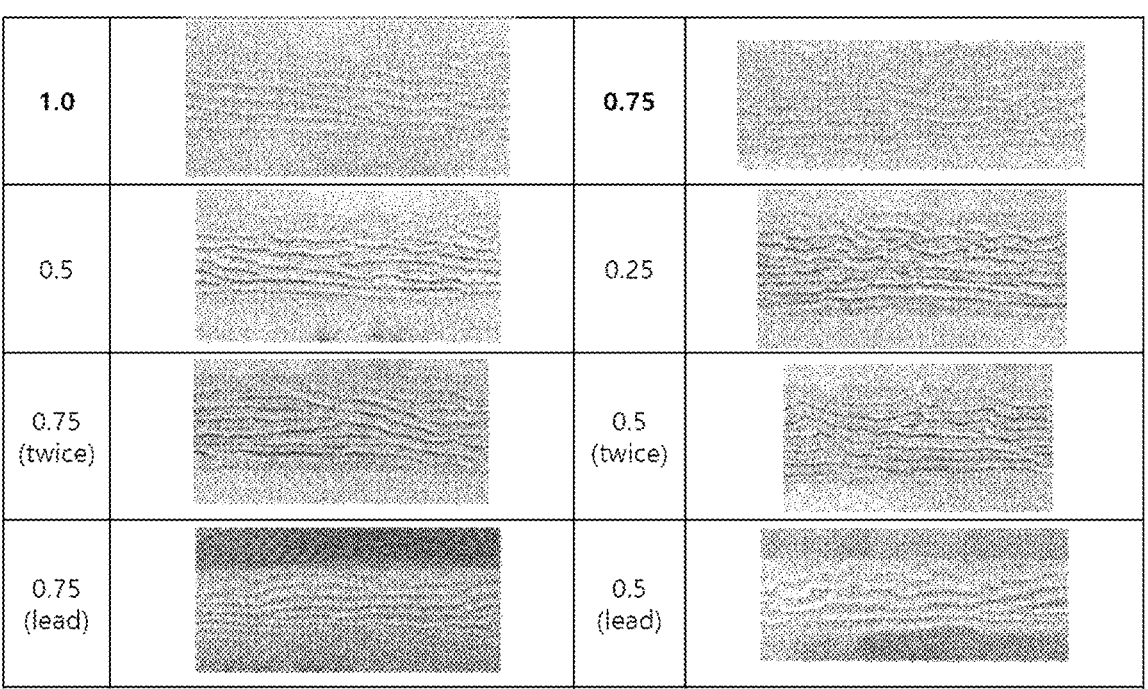
| 1.0 | | 0.75 | |
| 0.5 | | 0.25 | |
| 0.75 (twice) | | 0.5 (twice) | |
| 0.75 (lead) | | 0.5 (lead) | |

【FIG. 4】

-- Prior Art --

| | | | |
|---|---|---|---|
| 25%<br>10mm/s<br>250Hz | | 25%<br>15mm/s<br>250Hz | |
| 20%<br>5mm/s<br>100Hz | | 20%<br>10mm/s<br>100Hz | |
| 20%<br>5mm/s<br>150Hz | | 20%<br>5mm/s<br>200Hz | |

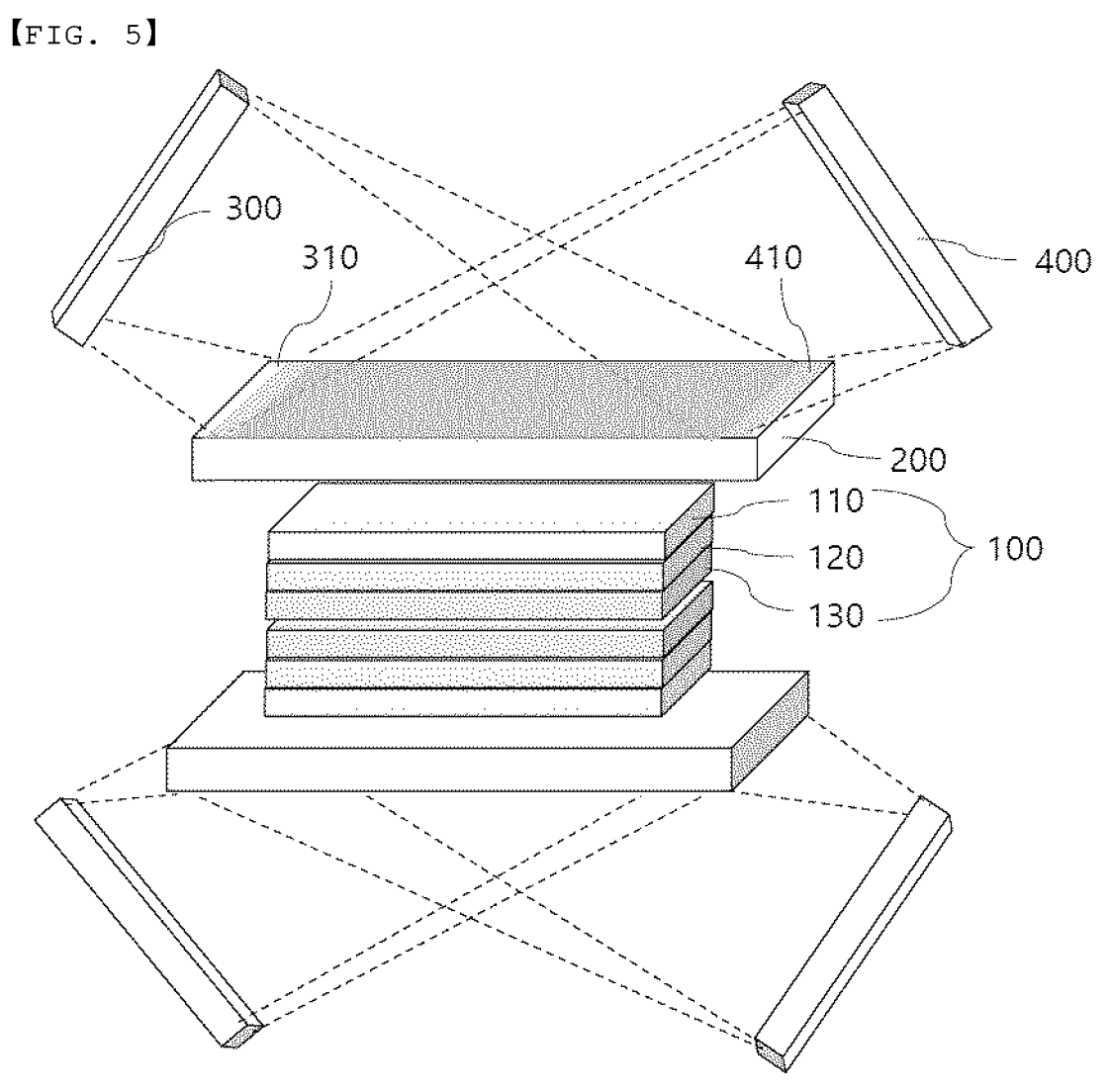

【FIG. 5】

【FIG. 6】
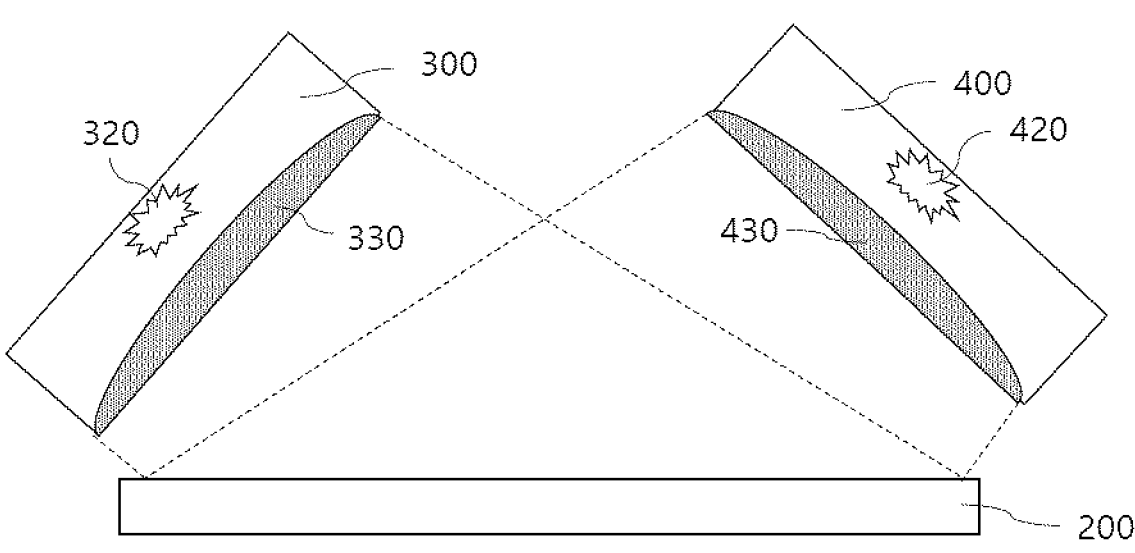

【FIG. 7】
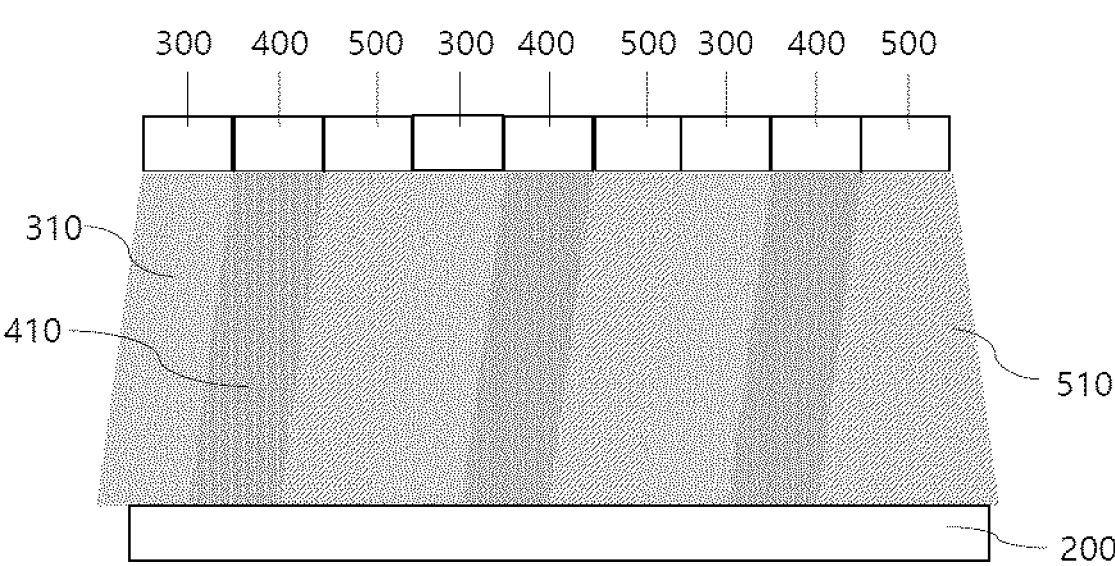

【FIG. 8】
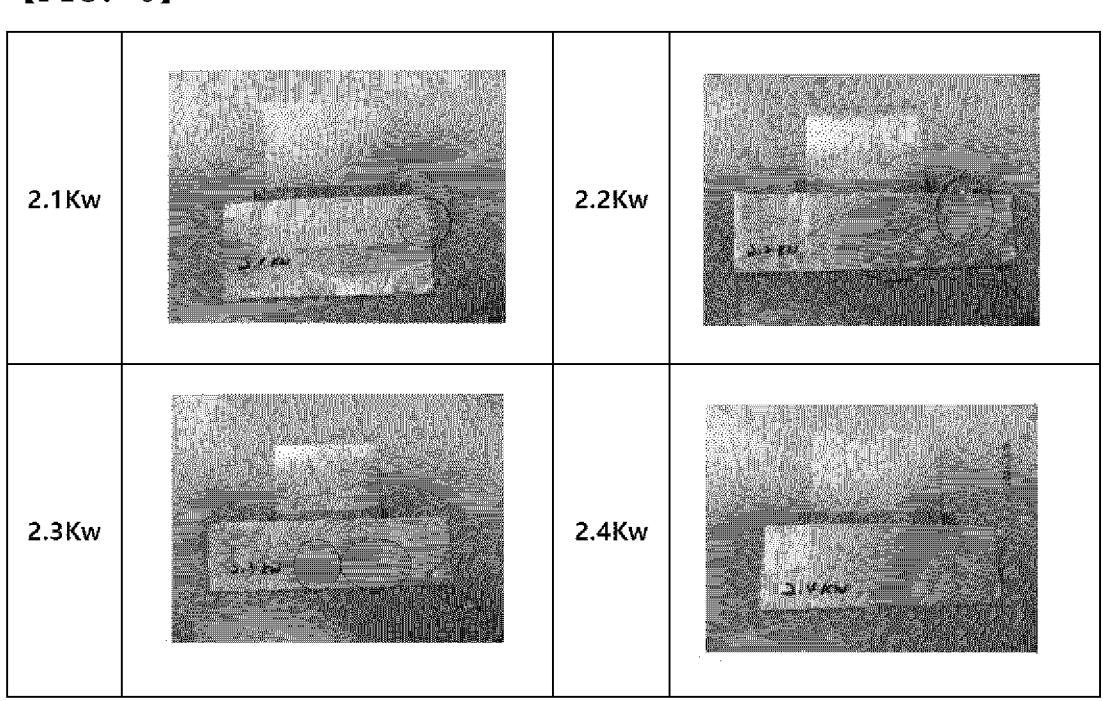

POUCH-SHAPED SECONDARY BATTERY SEALING APPARATUS AND POUCH-SHAPED SECONDARY BATTERY MANUFACTURING METHOD

CROSS-REFERENCE TO RELATED APPLICATIONS

This application is a national stage entry under 35 U.S.C. § 371 of International Application No. PCT/KR2021/001969, filed on Feb. 16, 2021, which claims priority to Korean Patent Application No. 10-2020-0074202 filed on Jun. 18, 2020, the disclosures of which are incorporated herein by reference in their entireties.

TECHNICAL FIELD

The present invention relates to a pouch-shaped secondary battery sealing apparatus and a pouch-shaped secondary battery manufacturing method, and more particularly to a pouch-shaped secondary battery sealing apparatus and a pouch-shaped secondary battery manufacturing method capable of sealing a sealed portion of a pouch-shaped secondary battery case including an aluminum layer without wrinkles, whereby it is possible to improve sealing quality.

BACKGROUND ART

With recent diversification of devices that use batteries, demand for high-capacity and high-density batteries has increased. Thereamong, a lithium secondary battery, which has high energy density and discharge voltage, has been commercialized and used in various forms.

Based on the external shape thereof, the lithium secondary battery is classified as a cylindrical secondary battery, a prismatic secondary battery, or a pouch-shaped secondary battery. Thereamong, the pouch-shaped secondary battery has advantages in that the thickness of an aluminum laminate sheet of the pouch-shaped secondary battery may be adjusted in order to obtain a high-capacity and high-density secondary battery and that the pouch-shaped secondary battery may have various shapes, and therefore multifaceted research on the pouch-shaped secondary battery has been conducted.

The pouch-shaped secondary battery is generally formed by shaping an aluminum laminate sheet to form a receiving portion, receiving an electrode assembly in the receiving portion, and sealing the periphery of the receiving portion. In order to form a sealed portion by sealing the periphery of the receiving portion, a conventional pouch-shaped secondary battery sealing apparatus performs pressing and heating using a single member.

FIG. 1 is a schematic view of a conventional pouch-shaped secondary battery sealing apparatus.

As can be seen FIG. 1, in the conventional pouch-shaped secondary battery sealing apparatus, sealed portions 10 of a pouch-shaped secondary battery case, each of which is made of a laminate sheet including an outer resin layer 11, a metal layer 12, and an inner sealant layer 13, are disposed such that the inner sealant layers 13 face each other, and the sealed portions are disposed between pressing portions 20 configured to simultaneously perform heating and pressing such that the sealed portions are sealed by the pressing portions.

In the conventional pouch-shaped secondary battery sealing apparatus, however, much time may be necessary until heat is transmitted from the outer resin layer 11 to the inner sealant layer 13, and the outer resin layer 11 may be damaged.

In order to solve this problem, Patent Document 1 discloses a method of sealing a pouch-shaped secondary battery using a laser.

FIG. 2 is a schematic view of a pouch-shaped secondary battery sealing apparatus according to Patent Document 1.

In the pouch-shaped secondary battery sealing apparatus according to Patent Document 1, sealed portions 10 of a pouch-shaped secondary battery case, each of which includes an outer resin layer 11, a metal layer 12, and an inner sealant layer 13, are disposed such that the inner sealant layers 13 face each other, and the sealed portions are disposed between pressing portions 20, in the same manner as in the conventional pouch-shaped secondary battery sealing apparatus.

In the pouch-shaped secondary battery sealing apparatus according to Patent Document 1, the pressing portion 20 is made of a material that transmits infrared light, and an infrared light radiation portion 30 is provided above the pressing portion, unlike the conventional pouch-shaped secondary battery sealing apparatus. In addition, the infrared light radiation portion 30 rapidly heats only the metal layer 12 of the sealed portion 10, whereby the shortcoming of the conventional pouch-shaped secondary battery sealing apparatus is overcome. In addition, the inner sealant layer 13 is melted by the heated metal layer 12, whereby sealing force is increased while damage to the outer resin layer 11 due to heat, which is caused in the conventional art, is reduced.

However, the pouch-shaped secondary battery sealing apparatus according to Patent Document 1 has a shortcoming in that the output of a laser must be high in order to heat the metal layer 12 disposed between the outer resin layer 11 and the inner sealant layer 13. In addition, there are problems in that heating is not uniformly performed, whereby uniform sealing is not achieved and wrinkles are formed in a laminate sheet.

FIG. 3 is a photograph of a laminate sheet sealed by the conventional pouch-shaped secondary battery sealing apparatus, and FIG. 4 is a photograph of a laminate sheet sealed by the pouch-shaped secondary battery sealing apparatus according to Patent Document 1.

In FIG. 3, the laminate sheet was sealed using the conventional pouch-shaped secondary battery sealing apparatus while a line pitch value was set to 0.25, 0.5, 0.75, and 1 under conditions of a laser output of 150 W, a speed of 100 m/s, and a width of 35 mm. As can be seen from FIG. 3, the surface of the laminate sheet sealed using the conventional pouch-shaped secondary battery sealing apparatus, i.e. a nylon layer, was damaged or wrinkled irrespective of the line pitch, whereby uniform sealing was not achieved.

In addition, as can be seen from FIG. 4, the laminate sheet was sealed using the pouch-shaped secondary battery sealing apparatus according to Patent Document 1 while the laser output, speed, and wable were changed. It can be seen from FIG. 4 that, in the case in which sealing was performed at an output of 25%, a speed of 10 mm/s, and a wable of 250 Hz, adhesion was uniform but the nylon layer was damaged and that, in the case in which sealing was performed at an output of 25%, a speed of 15 mm/s, and a wable of 250 Hz, an unadhered portion was generated, the nylon layer was damaged, and the laminate sheet was damaged when the wable was excessively strong. On the other hand, it can be seen that, in the case in which the wable was 150 Hz, 100 Hz, or 200 Hz, the laminate sheet was not adhered or some thereof was not adhered.

Therefore, there is needed a pouch-shaped secondary battery sealing apparatus and a pouch-shaped secondary battery manufacturing method capable of uniformly, safely, and rapidly forming a sealed portion of a pouch-shaped secondary battery case.

PRIOR ART DOCUMENT (Patent Document 1) Korean Patent Application Publication No. 2012-0056316 (2012.06.04)

DISCLOSURE

Technical Problem

The present invention has been made in view of the above problems, and it is an object of the present invention to provide a pouch-shaped secondary battery sealing apparatus and a pouch-shaped secondary battery manufacturing method capable of sealing a pouch-shaped secondary battery using at least two infrared light radiation portions, whereby it is possible to form a sealed portion having uniform sealing force, and capable of reducing exposure time to infrared light while performing sealing using a small output of infrared light.

It is another object of the present invention to reduce sealing time, to reduce a defect rate, and to improve productivity.

Technical Solution

A pouch-shaped secondary battery sealing apparatus according to the present invention to accomplish the above objects includes a pressing portion located above and/or under a sealed portion of a pouch-shaped secondary battery case including an aluminum layer, the pressing portion being made of a material capable of transmitting infrared light, a first infrared light radiation portion configured to radiate infrared light to the pressing portion, and a second infrared light radiation portion configured to radiate infrared light so as to overlap a radiation range of the first infrared light radiation portion.

At least one of the first infrared light radiation portion and the second infrared light radiation portion may radiate an LD wavelength (808 nm to 980 nm).

The pressing portion may be made of a quartz lens.

At least one of the first infrared light radiation portion and the second infrared light radiation portion may include a light source configured to radiate a laser and an adjustment lens located under the light source.

The adjustment lens may be a cylindrical lens.

The surface of the adjustment lens that faces the light source may be convex.

At least one of the first infrared light radiation portion and the second infrared light radiation portion may have an output density of 80 W/cm$^2$ or more.

The first infrared light radiation portion and the second infrared light radiation portion may heat aluminum or an aluminum alloy of the pouch-shaped secondary battery case.

The first infrared light radiation portion and the second infrared light radiation portion may be located above and under the sealed portion of the pouch-shaped secondary battery case.

The present invention provides a pouch-shaped secondary battery manufacturing method including S1) receiving an electrode assembly in a pouch-shaped secondary battery case made of a laminate sheet including an outer resin layer, a metal layer, and an inner sealant layer, the pouch-shaped secondary battery case including an electrode assembly receiving portion and a sealed portion formed so as to surround the electrode assembly receiving portion, S2) disposing the pouch-shaped secondary battery sealing apparatus above and under the sealed portion of the pouch-shaped secondary battery case, and S3) pressing the sealed portion using the pressing portion of the sealing apparatus while heating the sealed portion using the first infrared light radiation portion and the second infrared light radiation portion in order to seal the sealed portion, wherein radiation ranges of the first infrared light radiation portion and the second infrared light radiation portion overlap each other.

The metal layer may be made of aluminum or an aluminum alloy.

The first infrared light radiation portion and the second infrared light radiation portion may induce heating of the metal layer such that the inner sealant layer is melted by heat conducted therefrom.

At this time, the metal layer may be heated to 180° C. to 300° C.

In the present invention, one or more constructions that do not conflict with each other may be selected and combined from among the above constructions.

DESCRIPTION OF DRAWINGS

FIG. 1 is a schematic view of a conventional pouch-shaped secondary battery sealing apparatus.

FIG. 2 is a schematic view of a pouch-shaped secondary battery sealing apparatus according to Patent Document 1.

FIG. 3 is a photograph of a laminate sheet sealed by the conventional pouch-shaped secondary battery sealing apparatus.

FIG. 4 is a photograph of a laminate sheet sealed by the pouch-shaped secondary battery sealing apparatus according to Patent Document 1.

FIG. 5 is a schematic view showing a first embodiment of a pouch-shaped secondary battery sealing apparatus according to the present invention.

FIG. 6 is a schematic view showing a second embodiment of the pouch-shaped secondary battery sealing apparatus according to the present invention.

FIG. 7 is a schematic view showing a third embodiment of the pouch-shaped secondary battery sealing apparatus according to the present invention.

FIG. 8 is a photograph of a laminate sheet sealed by the pouch-shaped secondary battery sealing apparatus according to the present invention.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a pouch-shaped secondary battery sealing apparatus and a pouch-shaped secondary battery manufacturing method according to the present invention will be described in detail with reference to the accompanying drawings.

FIG. 5 is a schematic view showing a first embodiment of the pouch-shaped secondary battery sealing apparatus according to the present invention. The pouch-shaped secondary battery sealing apparatus according to the present invention includes a pressing portion 200 located above and/or under a sealed portion 100 of a pouch-shaped secondary battery case including an aluminum layer, the pressing portion being made of a material capable of transmitting infrared light, a first infrared light radiation portion 300 configured to radiate infrared light to the pressing portion 200, and a second infrared light radiation portion 400 configured to radiate infrared light so as to overlap a radiation range of the first infrared light radiation portion.

The sealed portion 100 may be made of a laminate sheet including an outer resin layer 110, a metal layer 120 including an aluminum layer, and an inner sealant layer 130.

The outer resin layer 110 serves to protect a battery from the outside, and therefore high tensile strength compared to the thickness thereof and weather resistance are required. The outer resin layer is mainly made of a polymer, such as an oriented nylon film or polyethylene terephthalate (PET). However, the present invention is not limited thereto.

The metal layer 120 serves to prevent air or moisture from being introduced into the battery. The material for the metal layer 120 is not particularly restricted as long as the material exhibits high shapeability and ductility while being capable of being heated by infrared light. For example, the metal layer may be made of aluminum or an aluminum alloy.

The inner sealant layer 130 serves to provide sealability as the result of being mutually thermally fused by heat and pressure that are applied in the state in which an electrode assembly is mounted therein, and is mainly made of a cast polypropylene (CPP) film. An adhesive layer may be added between the outer resin layer 110 and the metal layer 120 and/or between the metal layer 120 and the inner sealant layer 130. The adhesive layer serves to supplement low force of adhesion between the layers located at opposite surfaces of the adhesive layer.

The material for the pressing portion 200 is not restricted as long as the material transmits infrared light such that the infrared light directly heats the metal layer 120. As an example, the pressing portion 200 may be made of germanium, silicon, zinc sulfide, magnesium fluoride, sapphire, or glass. However, it is preferable to use glass, which is economical and hard. In particular, the pressing portion may be made of a quartz lens.

The first infrared light radiation portion 300 and the second infrared light radiation portion 400 according to the present invention serve to radiate infrared light to the pressing portion 200 in order to heat the metal layer 120. It is preferable for the metal layer 120 to be made of a material capable of being easily heated by the infrared light, such as aluminum or an aluminum alloy.

A first radiation range 310 of the first infrared light radiation portion 300 and a second radiation range 410 of the second infrared light radiation portion 400 are formed so as to overlap each other on the sealed portion of the pouch-shaped secondary battery case. At this time, the first radiation range 310 and the second radiation range 410 may be formed so as to overlap each other only on the sealed portion, as shown in FIG. 5. Alternatively, it is preferable for the first radiation range 310 and the second radiation range 410 to be provided only on the sealed portion, as shown in FIG. 5, and for the first radiation range 310 and the second radiation range 410 formed respectively by the first infrared light radiation portion 300 and the second infrared light radiation portion 400 to be provided so as not to overlap each other at the portions other than the sealed portion.

At least one of the first infrared light radiation portion 300 and the second infrared light radiation portion 400 may have an infrared wavelength of 700 nm to 1100 nm, preferably LD wavelength (808 nm to 980 nm).

In the case in which the infrared wavelength is too long, heating of the blocking metal layer or melting of the sealant layer may not be sufficiently induced or much time may be necessary therefor, which is undesirable. In the case in which the infrared wavelength is too short, on the other hand, the battery case may explode or catch figure due to high energy, which is also undesirable.

In addition, at least one of the first infrared light radiation portion 300 and the second infrared light radiation portion 400 may have an output density of 80 W/cm² or more. In the case in which the output density is less than 80 W/cm², the metal layer 120 may not be sufficiently heated, whereby the inner sealant layer 130 may not be melted. Preferably, the output density is 2.4 kW/cm² or more. In the case in which the output density is less than 2.4 kW/cm², the pouch-shaped secondary battery case may be wrinkled, whereby the pouch-shaped secondary battery case may not be uniformly sealed.

At least one of the first infrared light radiation portion 300 and the second infrared light radiation portion 400 may be spaced apart from the sealed portion 100 of the pouch-shaped secondary battery case by 20 mm to 40 cm.

The inner sealant layer 130 may be melted at 180° C. to 300° C. In the case in which the temperature deviates from the above range, the inner sealant layer may be insufficiently or excessively melted, whereby the sealed portion 100 may not be appropriately sealed.

As shown in FIG. 5, the first infrared light radiation portion 300 and the second infrared light radiation portion 400 may be located on the left side and the right side of the pressing portion 200, respectively. Alternatively, the first infrared light radiation portion 300 and the second infrared light radiation portion 400 may be located side by side above or under the pressing portion 200. The positions of the first infrared light radiation portion 300 and the second infrared light radiation portion 400 may be changed depending on the first radiation range 310 of the first infrared light radiation portion 300, the second radiation range 410 of the second infrared light radiation portion 400, the distance between the pressing portion 200 and the first infrared light radiation portion 300, the distance between the pressing portion 200 and the second infrared light radiation portion 400, and the output densities of the first infrared light radiation portion 300 and the second infrared light radiation portion 400.

The first infrared light radiation portion 300 and the second infrared light radiation portion 400 may be located only at one surface of the sealed portion 100 of the pouch-shaped secondary battery case, or may be located at opposite surfaces of the sealed portion 100 of the pouch-shaped secondary battery case, as shown in FIG. 5. At this time, when the first infrared light radiation portion 300 and the second infrared light radiation portion 400 are located at opposite surfaces of the sealed portion 100, as shown in FIG. 5, the pressing portion 200 may be located at the opposite surfaces of the sealed portion 100, or may be located only at one surface of the sealed portion 100. When the pressing portion 200 is located at the one surface of the sealed portion 100, a support for supporting the sealed portion 100 may be located at the other surface at which the pressing portion 200 is not located.

FIG. 6 is a schematic view showing a second embodiment of the pouch-shaped secondary battery sealing apparatus according to the present invention. The second embodiment of the pouch-shaped secondary battery sealing apparatus according to the present invention may have the same construction as the first embodiment described above, unless mentioned otherwise.

The pouch-shaped secondary battery sealing apparatus according to the second embodiment is characterized in that the first infrared light radiation portion 300 and the second infrared light radiation portion 400 include light sources 320 and 420 configured to radiate lasers and adjustment lenses 330 and 430 located under the light sources 320 and 420, respectively.

It is preferable that the first light source 320 be located at the first infrared light radiation portion 300 and the first adjustment lens 330 be located thereunder and that the second light source 420 be located at the second infrared light radiation portion 400 and the second adjustment lens 430 be located thereunder, as shown in FIG. 6.

The first adjustment lens 330 and/or the second adjustment lens 430 may serve to enlarge a radiation range of infrared light radiated by the first light source 320 and/or the second light source 420. To this end, the surface of each of the first adjustment lens 330 and the second adjustment lens 430 that face the first light source 320 and the second light source 420, respectively, may be convex. In this case, the first adjustment lens 330 or the second adjustment lens 430 may be a semi-cylindrical lens.

The first adjustment lens 330 and/or the second adjustment lens 430 may be mounted in the first infrared light radiation portion 300 and/or the second infrared light radiation portion 400, or may be located outside the first infrared light radiation portion 300 and/or the second infrared light radiation portion 400, to adjust the radiation range and the radiation direction of infrared light.

In addition, the pressing portion 200 may have a flat plate structure. Alternatively, in order to prevent energy loss due to dispersion of infrared light, a structure capable of preventing dispersion of light may be provided in the pressing portion. As an example, the opposite surface of the first infrared light radiation portion 300 and/or the second infrared light radiation portion 400 may be concave. In this case, the opposite surface of the pouch-shaped secondary battery case may be flat, or the outer surface of the pouch-shaped secondary battery case may be flat while the inner surface of the pouch-shaped secondary battery case may be convex.

FIG. 7 is a schematic view showing a third embodiment of the pouch-shaped secondary battery sealing apparatus according to the present invention.

The pouch-shaped secondary battery sealing apparatus according to the present invention includes a plurality of first infrared light radiation portions 300 and a plurality of second infrared light radiation portions 400.

A first radiation range 310 of each of the first infrared light radiation portions 300 is disposed so as to overlap a second radiation range 410 of a corresponding one of the second infrared light radiation portions 400 by at least half or more, and the portion of the second radiation range 410 that does not overlap the first radiation range 310 is disposed so as to overlap a third radiation range 510 of a third infrared light radiation portion 500. A plurality of infrared light radiation portions may be provided so as to have the same pattern as described above, and the radiation ranges thereof may be disposed so as to overlap each other, as shown in FIG. 7. As a result, it is possible to perform rapid sealing, to perform wide-range sealing, and to improve sealing force even though the output of infrared light is not high.

The present invention provides a pouch-shaped secondary battery manufacturing method including S1) a step of receiving an electrode assembly in a pouch-shaped secondary battery case made of a laminate sheet including an outer resin layer 110, a metal layer 120, and an inner sealant layer 130, the pouch-shaped secondary battery case including an electrode assembly receiving portion and a sealed portion 100 formed so as to surround the electrode assembly receiving portion, S2) a step of disposing the pouch-shaped secondary battery sealing apparatus above and under the sealed portion 100 of the pouch-shaped secondary battery case, and S3) a step of pressing the sealed portion 100 using the pressing portion 200 of the sealing apparatus while heating the sealed portion 100 using the first infrared light radiation portion 300 and the second infrared light radiation portion 400 in order to seal the sealed portion, wherein radiation ranges of the first infrared light radiation portion 300 and the second infrared light radiation portion 400 may overlap each other.

The disposition of the first infrared light radiation portion 300 and the second infrared light radiation portion 400 is not restricted as long as the radiation ranges thereof overlap each other. As an example, the first infrared light radiation portion 300 and the second infrared light radiation portion 400 may be disposed side by side, or may be disposed back and forth.

The first infrared light radiation portion 300 and the second infrared light radiation portion 400 induce heating of the metal layer 120 such that the inner sealant layer 130 is melted by heat conducted therefrom. Here, the metal layer 120 may be made of aluminum or an aluminum alloy. The metal layer 120 may be heated to 180° C. to 300° C. by infrared light.

FIG. 8 is a photograph of a laminate sheet sealed by the pouch-shaped secondary battery sealing apparatus according to the present invention.

Referring to FIG. 8, PPM412 was used as the infrared light radiation portions, and heat-resistant glass (double borosilicate) was used as the pressing portion. For the laminate sheet, two laminate sheets cut to a length of 60 mm and a width of 30 mm were disposed spaced apart from the infrared light radiation portions by about 150 mm and were sealed. At this time, radiation was simultaneously performed so as to correspond to the radiation area under conditions of a laser output of 2.1 kW and a width of 60 mm, and sealing was performed while the output value was changed in units of 0.1 kW.

As shown in FIG. 8, it can be seen that, in the case in which the output is 2.3 kW or less, pressing was not sufficiently performed, whereby portions that were not pressed were loosened and thus a bleaching phenomenon occurred, as indicated by circles in the figure. On the other hand, it can be seen that, in the case in which the output is 2.4 kW, all portions were uniformly adhered, whereby there was no loosened portion and thus no wrinkles occurred.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS

10, 100: Sealed portions
11, 110: Outer resin layers
12, 120: Metal layers
13, 130: Inner sealant layers
20, 200: Pressing portions
30: Infrared light radiation portion
300: First infrared light radiation portion
310: First radiation range
320: First light source
330: First adjustment lens
400: Second infrared light radiation portion
410: Second radiation range
420: Second light source
430: Second adjustment lens
500: Third infrared light radiation portion
510: Third radiation range

INDUSTRIAL APPLICABILITY

A pouch-shaped secondary battery sealing apparatus and a pouch-shaped secondary battery manufacturing method according to the present invention uniformly seal a sealed portion of a pouch-shaped secondary battery case, thereby increasing sealing force and reducing sealing defects.

In addition, radiation ranges of at least two infrared light radiation portions overlap each other, whereby a metal layer of a laminate sheet is rapidly heated and sealed, and therefore productivity is better than in the conventional art.

In addition, since infrared light is used, only a necessary portion is rapidly and accurately heated, whereby it is possible to reduce damage to the laminate sheet, and infrared light having various output ranges is used, whereby it is also possible to reduce energy consumption.

The invention claimed is:

1. A pouch-shaped secondary battery sealing apparatus comprising:
   a pressing portion configured to be disposed above or below a sealed portion of a pouch-shaped secondary battery case comprising a metal layer, the pressing portion being made of a material capable of transmitting infrared light therethrough;
   a first infrared light radiation portion configured to radiate the infrared light to the pressing portion; and
   a second infrared light radiation portion configured to radiate the infrared light to overlap a radiation area of the first infrared light radiation portion,
   wherein the first infrared light radiation portion and the second infrared light radiation portion are both located above the pressing portion or are both located below the pressing portion.

2. A secondary battery manufacturing method comprising:
   receiving an electrode assembly in a secondary battery case made of a laminate sheet comprising an outer resin layer, a metal layer, and an inner sealant layer, the secondary battery case comprising an electrode assembly receiving portion and a sealed portion surrounding the electrode assembly receiving portion; and pressing the sealed portion with a pressing portion while heating the sealed portion using a first infrared light radiation portion and a second infrared light radiation portion to seal the sealed portion,
   wherein the first infrared light radiation portion and the second infrared light radiation portion radiate infrared light to a same surface of the pressing portion, and radiation areas of the first infrared light radiation portion and the second infrared light radiation portion of the pressing portion overlap each other, and
   wherein the first infrared light radiation portion and the second infrared light radiation portion heat the metal layer such that the inner sealant layer is melted by heat conducted from the metal layer.

3. The secondary battery manufacturing method according to claim 2, wherein at least one of the first infrared light radiation portion and the second infrared light radiation portion is configured to radiate an LD wavelength (808 nm to 980 nm).

4. The secondary battery manufacturing method according to claim 2, wherein the pressing portion is made of a quartz lens.

5. The secondary battery manufacturing method according to claim 2, wherein at least one of the first infrared light radiation portion or the second infrared light radiation portion comprises:
   a light source configured to radiate a laser; and
   an adjustment lens located under the light source.

6. The secondary battery manufacturing method according to claim 5, wherein the adjustment lens has a cylindrical shape.

7. The secondary battery manufacturing method according to claim 5, wherein a surface of the adjustment lens that faces the light source is convex.

8. The secondary battery manufacturing method according to claim 2, wherein at least one of the first infrared light radiation portion or the second infrared light radiation portion is configured to have an infrared light radiation output density of 80 $W/cm^2$ or more.

9. The secondary battery manufacturing method according to claim 2, wherein the first infrared light radiation portion and the second infrared light radiation portion are each configured to heat an aluminum layer or an aluminum alloy layer of the secondary battery case.

10. The secondary battery manufacturing method according to claim 2, wherein the pressing portion is a first pressing portion configured to be disposed above the sealed portion of the secondary battery case,
   the apparatus further comprising a second pressing portion configured to be disposed below the sealed portion of the secondary battery case,
   the second pressing portion having a respective first infrared light radiation portion and a respective second infrared light radiation portion each configured to radiate the infrared light to the second pressing portion.

11. The secondary battery manufacturing method according to claim 2, wherein the metal layer is made of aluminum or an aluminum alloy.

12. The secondary battery manufacturing method according to claim 2, wherein, during the pressing of the sealed portion, the metal layer is heated to a temperature of 180° C. to 300° C.

* * * * *